US010070067B2

United States Patent
Jo et al.

(10) Patent No.: US 10,070,067 B2
(45) Date of Patent: Sep. 4, 2018

(54) SYSTEMS, METHODS, AND MEDIA FOR EXTRACTING INFORMATION AND A DISPLAY IMAGE FROM TWO CAPTURED IMAGES

(71) Applicant: Sony Corporation, Tokyo (JP)

(72) Inventors: Kensei Jo, Kumamoto (JP); Mohit Gupta, New York, NY (US); Shree K. Nayar, New York, NY (US)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 15/302,670

(22) PCT Filed: Apr. 15, 2015

(86) PCT No.: PCT/US2015/025994
§ 371 (c)(1),
(2) Date: Oct. 7, 2016

(87) PCT Pub. No.: WO2015/160967
PCT Pub. Date: Oct. 22, 2015

(65) Prior Publication Data
US 2017/0034412 A1  Feb. 2, 2017

Related U.S. Application Data

(60) Provisional application No. 62/073,787, filed on Oct. 31, 2014, provisional application No. 61/980,002, filed on Apr. 15, 2014.

(51) Int. Cl.
*H04N 5/235* (2006.01)
*G03B 17/48* (2006.01)
(Continued)

(52) U.S. Cl.
CPC .......... *H04N 5/2352* (2013.01); *G03B 17/48* (2013.01); *H04B 10/116* (2013.01);
(Continued)

(58) Field of Classification Search
CPC .............. H04N 5/2353; H04N 5/3532; H04N 5/35581; G02B 7/28; G03B 7/097; G06K 9/46; G06K 9/4661
See application file for complete search history.

(56) References Cited

U.S. PATENT DOCUMENTS 8,797,433 B2  8/2014  Kaizu et al.
8,798,395 B2  8/2014  Jo
(Continued)

OTHER PUBLICATIONS

U.S. Appl. No. 13/399,222, filed Feb. 17, 2012, Kaizu et al.
(Continued)

*Primary Examiner* — Trung Diep
(74) *Attorney, Agent, or Firm* — Wolf, Greenfield & Sacks, P.C.

(57) ABSTRACT

Systems, methods, and media for extracting information and a display image from two captured images are provided, in some embodiments, systems for extracting information and a display image from two captured images are provided, the systems comprising: a rolling shutter sensor; and a hardware processor coupled to the rolling shutter sensor that is configured to: cause the rolling shutter sensor to capture two captured images; receive the two captured images; and extract the information, and the display image from the two captured images, wherein the information is represented in the captured images as a flicker pattern.

27 Claims, 7 Drawing Sheets

(51) Int. Cl.

| | | |
|---|---|---|
| *H04N 5/353* | (2011.01) | |
| *H04N 5/355* | (2011.01) | |
| *H04N 5/66* | (2006.01) | |
| *H04N 7/01* | (2006.01) | |
| *H04B 10/116* | (2013.01) | |
| *H04N 5/232* | (2006.01) | |
| *G03B 19/02* | (2006.01) | |
| *G03B 21/26* | (2006.01) | |
| *H04N 5/445* | (2011.01) | |

(52) U.S. Cl.
CPC ......... *H04N 5/2356* (2013.01); *H04N 5/2357* (2013.01); *H04N 5/23267* (2013.01); *H04N 5/3532* (2013.01); *H04N 5/35563* (2013.01); *H04N 5/35581* (2013.01); *H04N 5/66* (2013.01); *H04N 7/0132* (2013.01); *G03B 19/026* (2013.01); *G03B 21/26* (2013.01); *H04N 5/445* (2013.01)

(56) References Cited

U.S. PATENT DOCUMENTS

| | | | |
|---|---|---|---|
| 8,803,985 B2 | 8/2014 | Kaizu et al. | |
| 8,848,063 B2 | 9/2014 | Jo et al. | |
| 8,933,924 B2 | 1/2015 | Sato | |
| 9,036,060 B2 | 5/2015 | Kaizu et al. | |
| 9,060,134 B2 | 6/2015 | Mitsunaga | |
| 9,100,514 B2 | 8/2015 | Gu et al. | |
| 9,124,809 B2 | 9/2015 | Kaizu et al. | |
| 9,344,637 B2 | 5/2016 | Kasai et al. | |
| 9,357,137 B2 | 5/2016 | Mitsunaga | |
| 2008/0106608 A1* | 5/2008 | Clark | H04N 5/23248 348/208.99 |
| 2008/0207975 A1* | 8/2008 | Crone | C07C 5/3337 585/655 |
| 2008/0246852 A1* | 10/2008 | Mori | G06K 9/00228 348/222.1 |
| 2011/0255786 A1 | 10/2011 | Hunter | |
| 2012/0194698 A1* | 8/2012 | Cami | H04N 5/2353 348/226.1 |
| 2012/0218426 A1 | 8/2012 | Kaizu et al. | |
| 2012/0281111 A1 | 11/2012 | Jo et al. | |
| 2012/0287294 A1 | 11/2012 | Kaizu et al. | |
| 2012/0314124 A1 | 12/2012 | Kaizu et al. | |
| 2012/0320232 A1* | 12/2012 | Trumbo | H04N 5/2357 348/226.1 |
| 2013/0033616 A1 | 2/2013 | Kaizu et al. | |
| 2013/0050177 A1 | 2/2013 | Sato | |
| 2013/0050284 A1 | 2/2013 | Sato | |
| 2013/0050520 A1 | 2/2013 | Takeuchi | |
| 2013/0051700 A1 | 2/2013 | Jo | |
| 2013/0070121 A1 | 3/2013 | Gu et al. | |
| 2013/0126713 A1 | 5/2013 | Haas et al. | |
| 2013/0308044 A1 | 11/2013 | Mitsunaga | |
| 2013/0329128 A1 | 12/2013 | Kaizu et al. | |
| 2014/0192235 A1 | 7/2014 | Hitomi et al. | |
| 2014/0192250 A1 | 7/2014 | Mitsunaga | |
| 2014/0267828 A1 | 9/2014 | Kasai et al. | |
| 2014/0313400 A1 | 10/2014 | Kaizu et al. | |
| 2014/0321766 A1 | 10/2014 | Jo | |
| 2014/0340550 A1 | 11/2014 | Kaizu et al. | |
| 2014/0368697 A1 | 12/2014 | Jo et al. | |
| 2015/0207975 A1* | 7/2015 | Nguyen | H04N 5/2357 348/228.1 |
| 2015/0249496 A1* | 9/2015 | Muijs | H04B 10/116 398/118 |
| 2015/0312463 A1 | 10/2015 | Gupta et al. | |
| 2015/0341576 A1 | 11/2015 | Gu et al. | |
| 2016/0248956 A1 | 8/2016 | Mitsunaga | |

OTHER PUBLICATIONS

U.S. Appl. No. 13/452,977, filed Apr. 23, 2012, Jo et al.
U.S. Appl. No. 13/457,774, filed Apr. 27, 2012, Kaizu et al.
U.S. Appl. No. 13/487,682, filed Jun. 4, 2012, Kaizu et al.
U.S. Appl. No. 13/504,905, filed Dec. 7, 2012, Gu et al.
U.S. Appl. No. 13/559,720, filed Jul. 27, 2012, Kaizu et al.
U.S. Appl. No. 13/565,202, filed Aug. 2, 2012, Takeuchi.
U.S. Appl. No. 13/983,672, filed Aug. 5, 2013, Mitsunaga.
U.S. Appl. No. 14/000,647, filed Aug. 21, 2013, Kaizu et al.
U.S. Appl. No. 14/001,139, filed Mar. 24, 2014, Hitomi et al.
U.S. Appl. No. 14/131,221, filed Mar. 21, 2014, Kasai et al.
U.S. Appl. No. 14/238,216, filed Feb. 11, 2014, Mitsunaga.
U.S. Appl. No. 14/319,212, filed Jun. 30, 2014, Kaizu et al.
U.S. Appl. No. 14/326,963, filed Jul. 9, 2014, Kaizu et al.
U.S. Appl. No. 14/472,153, filed Aug. 28, 2014, Jo et al.
U.S. Appl. No. 14/652,397, filed Jun. 15, 2015, Gupta et al.
U.S. Appl. No. 14/816,976, filed Aug. 3, 2015, Gu et al.
U.S. Appl. No. 15/143,336, filed Apr. 29, 2016, Mitsunaga.
U.S. Appl. No. 15/405,962, filed Jan. 13, 2017, Hitomi et al.
Armstrong et al., Visible Light Positioning: A Roadmap for International Standardization, IEEE Communications Magazine, 2013, vol. 51, Issue 12, 6 pages.
Armstrong J., OFDM for Optical Communications, Journal of Lightwave Technology, 2009, vol. 27, No. 3, pp. 189-204.

* cited by examiner

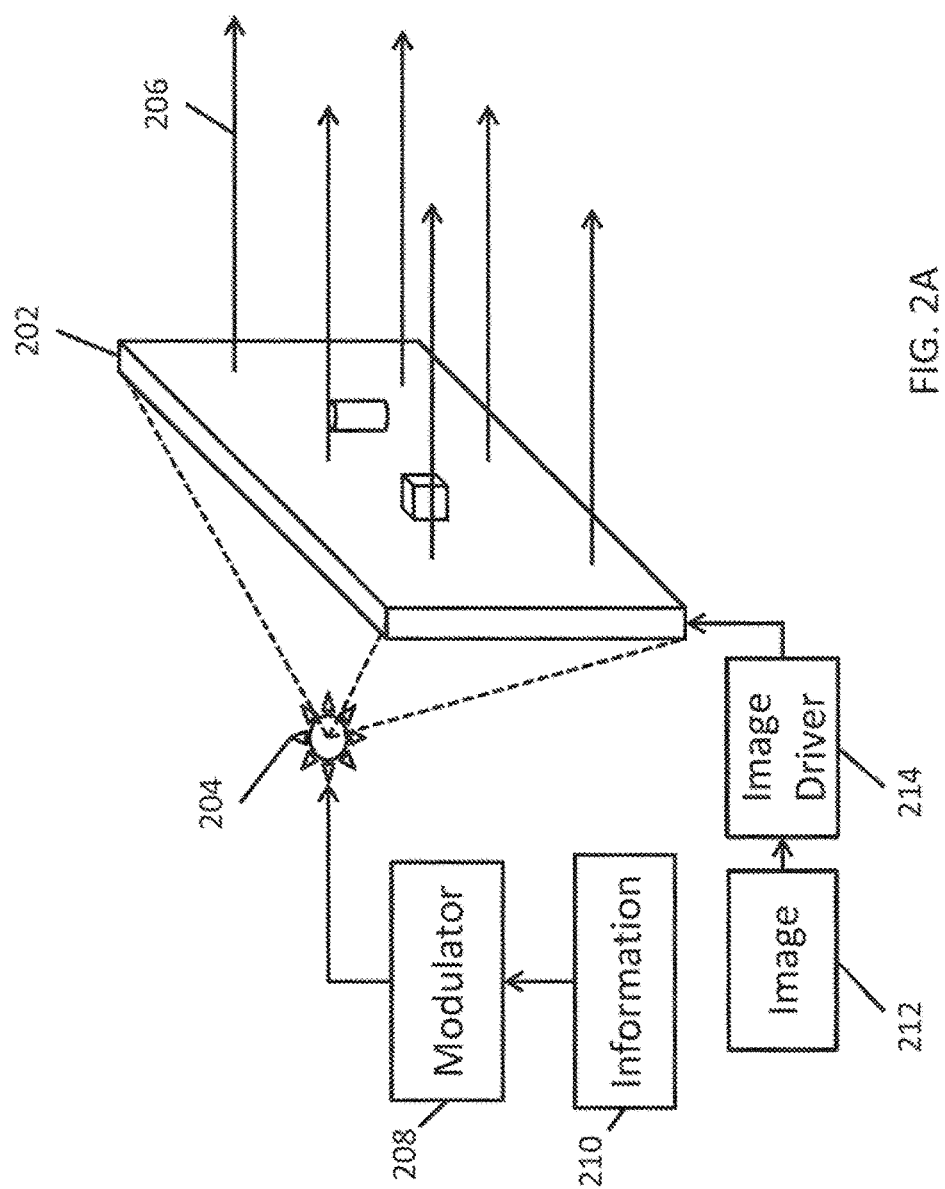

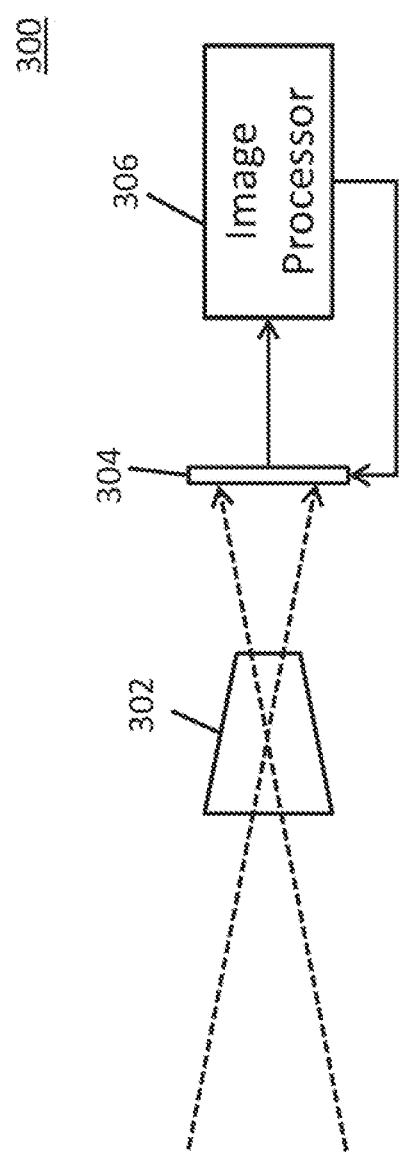

SYSTEMS, METHODS, AND MEDIA FOR EXTRACTING INFORMATION AND A DISPLAY IMAGE FROM TWO CAPTURED IMAGES

CROSS REFERENCE TO RELATED APPLICATIONS

This application claims the benefit under 35 U.S.C. § 371 as a U.S. National Stage Entry of International Application No. PCT/US2015/025994, filed in the U.S. Patent and Trademark Office as a Receiving Office on Apr. 15, 2015, which claims priority to U.S. Provisional Patent Application No. 61/980,002, filed Apr. 15, 2014, and U.S. Provisional Patent Application No. 62/073,787, filed Oct. 31, 2014, which are hereby incorporated by reference herein in their entireties.

BACKGROUND

Displayed images are ubiquitous in the modern world. Such images can be presented via paintings, paper pictures, digital picture frames, paper and electronic billboards, advertisements, computer monitors, digital signage, and a wide variety of other mechanisms that shown images to human observers.

It is frequently beneficial to convey information with displayed images. For example, it may be beneficial to convey a Web address for a car company along with a picture of an available car so that an interested viewer can access more information about the car. Naturally, there are countless other examples of instances in which it would be beneficial to convey information with images.

Accordingly, new mechanisms for conveying information with images are provided.

SUMMARY

Systems, methods, and media for extracting information and a display image from two captured images are provided. In some embodiments, systems for extracting information and a display image from two captured images are provided, the systems comprising: a rolling shutter sensor; and a hardware processor coupled to the rolling shutter sensor that is configured to: cause the rolling shutter sensor to capture two captured images; receive the two captured images; and extract the information and the display image from the two captured images, wherein the information is represented in the captured images as a flicker pattern.

In some embodiments, methods for extracting information and a display image from two captured images are provided, the methods comprising causing a rolling shutter sensor to capture two captured images using a hardware processor; receiving the two captured images using the hardware processor; and extracting the information and the display image from the two captured images using the hardware processor, wherein the information is represented in the captured images as a flicker pattern.

In some embodiments, non-transitory computer-readable media containing computer executable instructions that, when executed by a processor, cause the processor to perform method for extracting information and a display image from two captured images are provided, the method comprising: causing a rolling shutter sensor to capture two captured images; receiving the two captured images; and extracting the information and the display image from the two captured images, wherein the information is represented it the captured images as a flicker pattern.

BRIEF DESCRIPTION OF THE DRAWINGS

FIG. 2A is an example of a block diagram of an image display with modulated brightness that can be used in accordance with some embodiments.

FIG. 3A is an example of a block diagram of a rolling shutter camera with image processor that can be used in accordance with some embodiments.

DETAILED DESCRIPTION

Systems, methods, and media for extracting information and a display image from two captured images are provided.

In accordance with some embodiments, mechanisms (which can include systems, methods, and media) for extracting information and a display image from two captured images can enable displays and cameras to communicate with each other, while also displaying and capturing images for human consumption. A message can be transmitted with these displays by temporally modulating a display's brightness at high frequencies (that are imperceptible to humans) while displaying an image. The message can then be captured by a rolling shutter camera which converts the temporally modulated incident light into a spatial flicker pattern. In the captured image, the flicker pattern will be superimposed on the image shown on the display. The flicker pattern and the display image can be separated by performing suitable signal processing on two such captured images of the display that are captured with different exposure settings.

Figure 1:
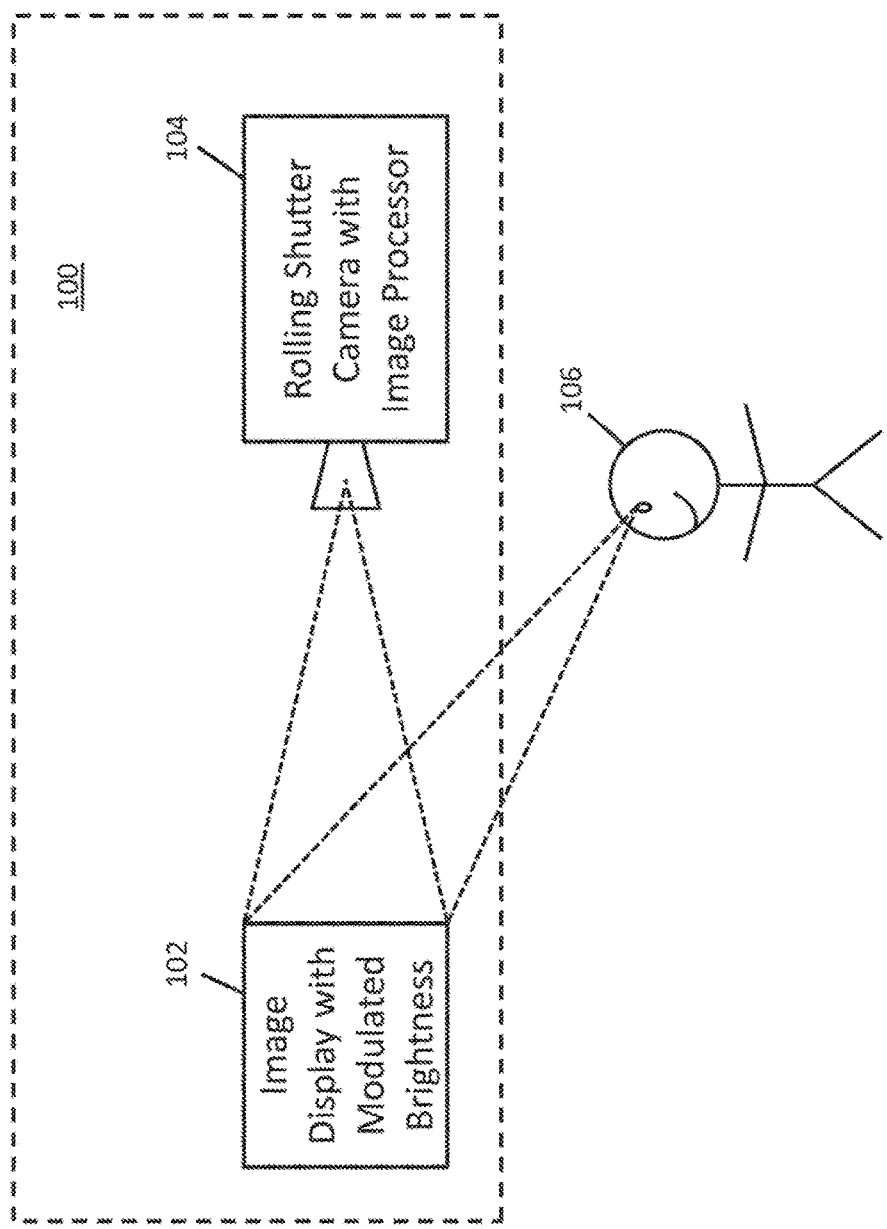
FIG. 1 is an example of block diagram of hardware that can be used in accordance with some embodiments.

Turning to FIG. 1, an example 100 of hardware that can be used implement some embodiments is illustrated. As shown, hardware 100 can include an image display with modulated brightness 102 and a rolling shutter camera with image processor 104. As also shown human 106 can look at display 102 and observe a displayed image without noticing the modulating of the display's brightness.

Any suitable image display with a modulated brightness can be used as display 102 in some embodiments. For example, as shown in FIG. 2A, display 102 can be implemented using backlit display 202. Display 202 can be backlit by a modulated light source 204 that is driven by a modulator 208 based on information from an information source 210 (such as a memory device, an interface, a hardware processor, etc.). Modulated light source 204 can be any suitable light source, such as one or more LEDs.

In some embodiments, display 202 can be a controllable display, such as an LCD display. In such a case, an image presented on display 202 can be controlled by image driver 214 based on an image from an image source 212 (such as a memory device, an interface, a hardware process etc.). In some embodiments, display 202 can be a non-controllable display, such as a glass display that holds a fixed transparency with content printed thereon. In such a case, no image driver or image source is needed.

Figure 2B:
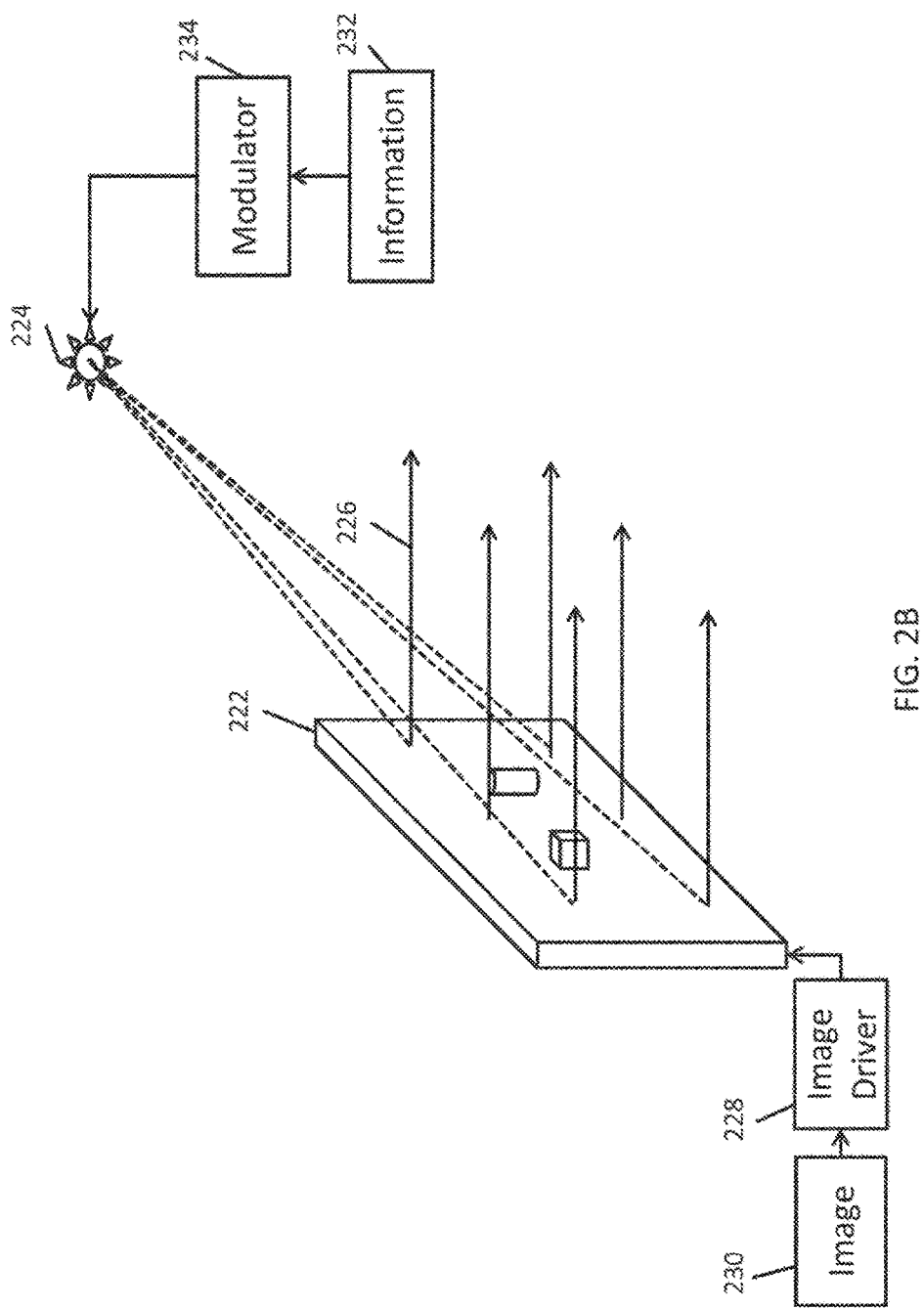
FIG. 2B is an example of a block diagram of another image display with modulated brightness that can be used in accordance with some embodiments.

Another example of a display that can be used to implement display 102 is shown in FIG. 2B. As illustrated, display 102 can be implemented using a reflective display 222. Display 222 can be illuminated by a modulated light source 224 that is driven by a modulator 234 based on information from an information source 232 such as a memory device, an interface, a hardware processor, etc.). Modulated light source 204 can be any suitable light source, such as one or more LEDs and ceiling light, etc.

In some embodiments, display 222 can be a controllable display, such as a transflective display. In such a case, an image presented on display 222 can be controlled by image driver 228 based on an image from image source 230 (such as a memory device, an interface, a hardware processor, etc.). In some embodiments, display 202 can be a non-controllable display, such as a printed piece of paper, a work of art, etc. In such a case, no image driver or image source is needed.

Although two examples of displays that can be used to implement display 102 are shown above, it should be apparent to one of ordinary skill in the art that any suitable mechanism that provides an image and a modulated light source can be used to implement display 102.

In some embodiments, multiple modulated light sources can be used per display 102 and/or multiple displays 102 can be used to provide a higher data rate and/or multiple streams of information. When multiple modulated light sources are used with the same display, the light sources can be used at different frequencies for the same portion of the display or can be used at any suitable frequency for different portions of the display.

Turning to FIG. 3A, an example 300 of a rolling shutter camera with image processor that can be used as a rolling shutter camera with image processor 104 in some embodiments is shown. As illustrated, camera/processor 300 can include a lens 302, an image sensor 304, and an image processor 306. Lens 302 can be any suitable lens. Image sensor 304 can be any suitable sensor for implementing a rolling shutter camera. Image processor 306 can be any suitable hardware image processor for receiving and processing images from sensor 304 and for controlling sensor 304.

Figure 3B:
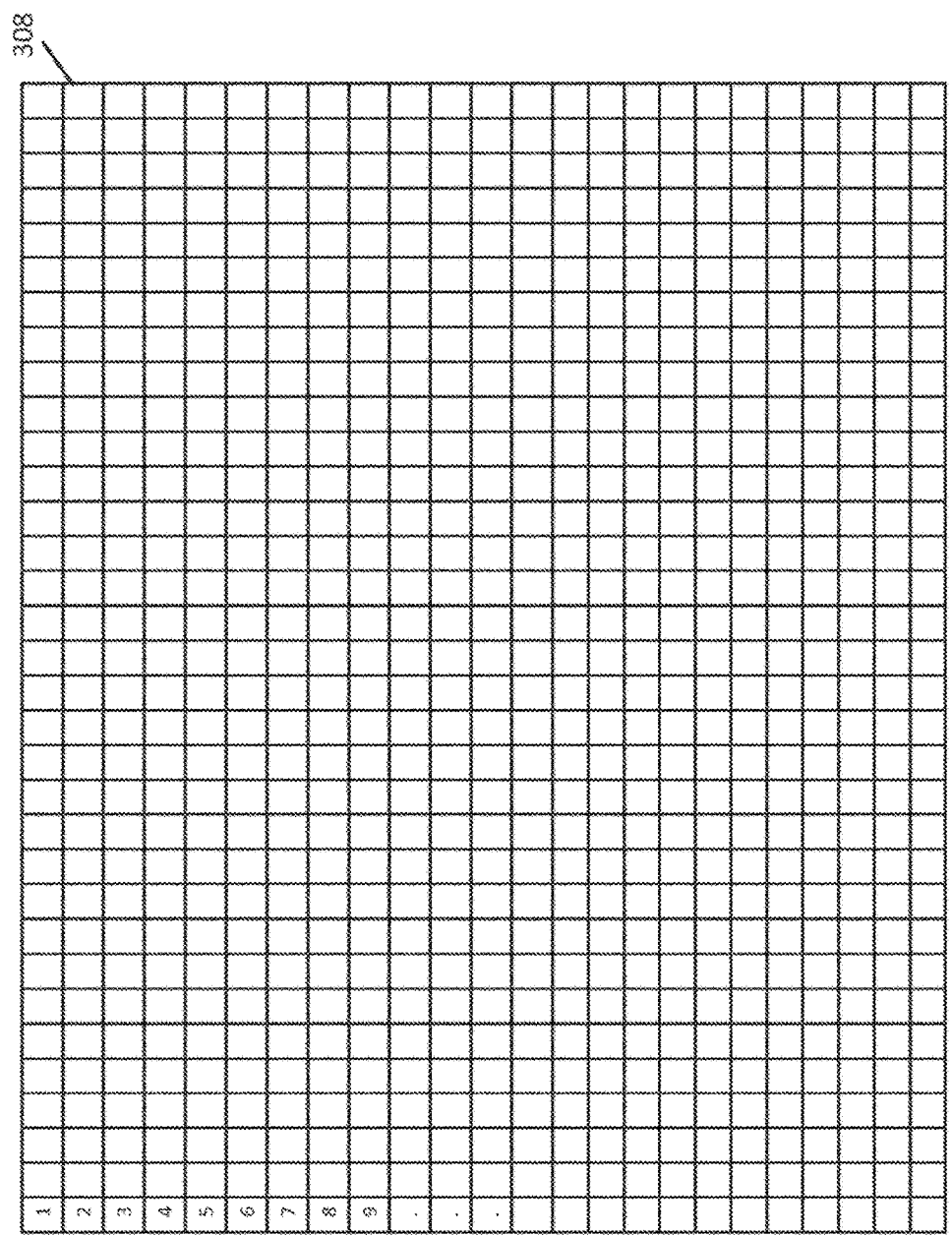
FIG. 3B is an example of an illustration of the operation of a rolling shutter sensor in accordance with some embodiments.

When acting as a rolling shutter camera, sensor 304 can capture light one row at a time. For example, as shown in FIG. 3B, sensor 308 can first capture light in row 1. Next sensor 308 can capture light in row 2. Then, sensor 308 can capture light in the remaining rows one at a time. This converts the temporally modulated light coming from the display into a spatial flicker pattern in the captured image. The flicker encodes the transmitted signal (the information). However, the flicker pattern is superimposed with the (unknown) display image, and therefore must be extracted.

As mentioned above, in order extract the information and the display image from the captured image, two images can be captured and processed. An example of a mechanism through which this occurs is described below.

In order to capture two images, any suitable technique can be used. For example, in some embodiments, a bracketing mode can be used in which two sequential pictures are rapidly taken. Such an approach performs best when there is little or no movement of the camera. In instances where there is some movement, any suitable mechanism can be used to correct the captured image(s) for that motion.

Figure 3C:
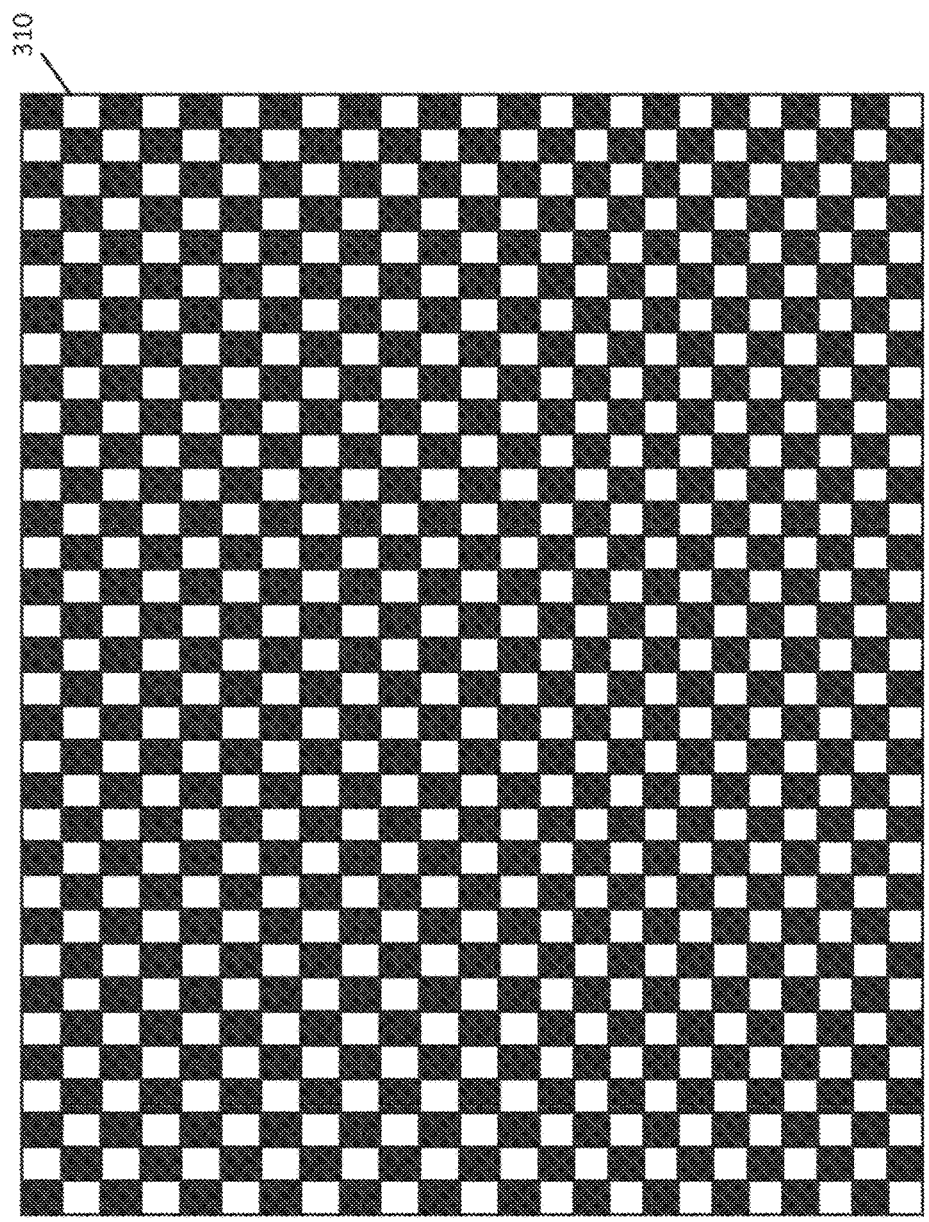
FIG. 3C is an example of an illustration of the operation of a simultaneous dual exposure (SDE) sensor in accordance with some embodiments.

As another example, in some embodiments, a simultaneous dual exposure (SDE) sensor can be used. An illustration 310 of an example of a SDE sensor is shown in FIG. 3C. As illustrated, different pixels (represented by boxes in the grid shown in FIG. 3C) in the sensor can be used to capture different images. For example, the white pixels can be used to capture one image of a scene (display 102) at one exposure setting and the black pixels can be used to capture another image of the scene (display 102) at another exposure setting, in some embodiments.

In the following paragraphs, an example of a way in which the information and the display image can be extracted from two captured images, in accordance with some embodiments, is described.

In the following paragraphs, it is assumed that the display completely occupies the sensor field-of-view so that every sensor pixel receives light only from the display area. This assumption is made only for ease of explanation, and is not a requirement of the mechanisms described herein. In general, a sensor pixel may receive light from outside the display, due to the display not completely occupying the sensor's field of view or due to occlusions. It can be shown that the image formation model for the general case has the same form as that of the special case where pixels receive light only from the display.

Conceptually, the display can be thought of as having two layers—a signal layer and a texture layer. The signal layer contains the information to be conveyed and the texture layer contains an image that is displayed for human consumption.

As set forth above, the information can be transmitted from display 102 to camera/processor 104 by temporally modulating the brightness of the display. The function through which the brightness is modulated is referred to herein as the signal function, $f(t)$.

Any suitable technique for modulating the brightness of the display can be used in some embodiments. For example, in some embodiments, phase-shift keying (PSK) signal coding, where information is embedded in the phase of sinusoidal signals at any suitable frequency (e.g., 500 Hz), can be used. More particularly, for example, binary PSK signal coding, where the phase $\theta$ of sinusoids takes binary values (0 and $\pi$), thus encoding binary can be used to encode and transmit bits sequentially in time in some embodiments.

As the camera observes the display, a combination of light rays (shown as 206 and 226 in FIGS. 2A and 2B, respectively) impact the camera's sensor. Let $l(x,y,t)$ be the radiance incident at sensor pixel $(x,y)$ at time $t$. For simplicity, a single color channel is considered in the present example. For multiple color sensors, similar analysis can be done individually for each color channel.

Because the entire display is modulated by a single temporal function $f(t)$ (in the present example), the radiance $l(x,y,t)$ can be factorized into spatial and temporal components:

$$l(x,y,t) = l_{tex}(x,y) f(t) \quad (1)$$

where $l_{tex}(x,y)$ is the amplitude of the temporal radiance profile at pixel $(x,y)$, and is determined by the display's texture layer. Note that the temporal radiance profiles at different sensor pixels differ only in their amplitude $l_{tex}(x,y)$. Let $e(x,y,t)$ be the exposure function at pixel $(x,y)$. If pixel $(x,y)$ is on (i.e., it captures light) at time $t$, $e(x,y,t)=1$, otherwise, if the pixel is off (i.e., it does not capture light) at time $t$, $e(x,y,t)=0$. The measured brightness value $i(x,y)$ is:

$$i(x, y) = k \int_{-\infty}^{\infty} l(x, y, t) e(x, y, t) \, dt \quad (2)$$

where k is the sensor gain that converts radiance to pixel brightness. Since the sensor has a rolling shutter, different rows capture light during different, shifted time intervals. The amount of shift is determined by the row index y and the speed of the rolling shutter. The exposure function e(x,y,t) can be modeled as a time-shifted function s(t):

$$e(x,y,t) = s(t-t_y) \quad (3)$$

where $t_y$ is the temporal shift for a pixel in row y. The function s(t), called the shutter function, can be any suitable function, such as a rect (pill-box) function, temporally coded shutter functions, a temporal Gaussian a high frequency binary code, or any other suitable function.

Substituting equations (1) and (3) into equation (2) provides:

$$i(x, y) = k \, l_{tex}(x, y) \int_{-\infty}^{\infty} s(t - t_y) f(t) \, dt = k \, l_{tex}(x, y) g'(t_y) \quad (4)$$

where $g'(t_y) = (s*f)(t_y)$ is the convolution of the signal and the shutter functions. $g'(t_y)$ is a function of the temporal shift $t_y$, which in turn depends on the sensor row index y. Typically, $t_y = y/r$, where r is the speed of the rolling shutter in rows per second.

Equation (4) can be re-written as:

$$i(x,y) = i_{tex}(x,y) \times g(y) \quad (5)$$

where $i_{tex}(x,y) = k \times l_{tex}(x,y)$ represents the display image, and $g(y) = g'(t_y) = (s*f)(t_y)$ is the signal image that encodes the signal function f(t). Equation (4) states that the texture layer and the signal layer of the display can be observed as two separable (and unknown) components: the display image and the signal image. The temporal signal f(t) manifests only in the signal image g(y), and the display's texture layer is captured only in the display image $i_{tex}(x,y)$.

When the display brightness is changing, the signal image g(y) varies along the y dimension because different sensor rows sample the signal function f(t) at different instants. However, all the pixels in a given row sample f(t) at the same instant, and thus should have the same intensity for f(t). As a result, g(y) has the form of a horizontal flicker pattern. Since the signal image g(y) is one-dimensional (1-D), for computational efficiency, analysis can be performed on horizontal sum images, which are 1-D signals, i.e., $i(y) = \Sigma_x i(x,y)$ and $i_{tex}(y) = \Sigma_x i_{tex}(x,y)$. Saturated image pixels can be excluded from the summation. Then, equation (5) can be written as $i(y) = i_{tex}(y) \times g(y)$. For the remainder of the discussion below, this 1-D form of the image formation equation is used.

The image formation model in equation (5) is derived without making any assumptions about the display's shape, orientation or location with respect to the sensor, or about imaging parameters such as zoom and defocus. Since the signal component g(y) depends only on the signal function f(t) and the shutter function s(t), any changes in display-sensor geometry or imaging parameters zoom and focus) manifest only in the display image $i_{tex}(x,y)$. Specifically, the display's orientation and location determine the shape of the display's projection in the captured image, sensor zoom influences the size of the displays projection, and camera focus determines the amount of blur in the display image (signal image g(y) is invariant to camera defocus).

If the display is partially occluded so that it is visible to a (non-empty) subset of pixels in each sensor row, because the captured image is summed horizontally, the signal image g(y) is still sampled at every row location. If $\alpha_y > 0$ is the fraction of pixels in sensor row y that see the display, the amplitude of the signal image can be scaled by $\alpha_y$. Under mild assumptions, $\alpha_y$ can be assumed to be locally constant, and absorbed in the display image. As a result, the signal image is always a horizontal flicker pattern. Its functional form and structure are invariant to the display-camera geometry, partial occlusions and camera parameters.

In some embodiments, f(t) can be a 500 Hz sinusoidal signal and the shutter s(t) can be a rect function of width 0.5 ms such that s(t)=1 when 0≤t≤0.5 ms, otherwise s(t)=0. This can result in a sinusoidal flicker pattern. Notice that the period of the flicker, $h_{sine}$, is independent of camera-display geometry or camera zoom. Even if only a small fraction of the display is visible to the camera due to large zoom, the flicker image can retain the same structure, and captures the information contained in the signal function, in some embodiments.

In order to decode the information in the signal image g(y), it weds to be separated from the display image $i_{tex}(y)$. Since both signal and display components are unknown, in general, they cannot be separated from a single captured image. However, if two images $i_1(y)$ and $i_2(y)$ are captured with two different shutter functions $s_1(t)$ and $s_2(t)$, two different equations are obtained, which will enable the signal image and the display image to be separated.

As described above, in some embodiments, the two images can be captured sequentially using the exposure bracketing mode. This approach, while suitable for static scenes and cameras, is prone to errors if there is scene/camera motion. As also described above, in some embodiments the two mages can be captured using a single SDE sensor that captures two images with different exposure functions simultaneously in a single shot.

The two images can be given as:

$$i_1(y) = i_{tex}(y) \times (s_1 * f)(t_y) \quad (6)$$

$$i_2(y) = i_{tex}(y) \times (s_2 * f)(t_y) \quad (7)$$

This is a system of two equations in two unknowns: signal f(t) and the flicker-free display image $i_{tex}(y)$. Since the shutter functions $s_1(t)$ and $s_2(t)$ are known, these two equations can be solved simultaneously to recover both f(t) and the flicker-free image $i_{tex}(x,y)$.

The signal f(t) can be considered to be a sum of sinusoids of different frequencies (the set of frequencies is typically a small, discrete set). These frequencies can have any suitable values such as 1 kHz, 2 kHz, 3 kHz, 4 kHz, etc. This signal encoding scheme is called orthogonal-frequency-division-multiplexing (OFDM). However, any suitable encoding scheme can be used in some embodiments.

Figure 4:
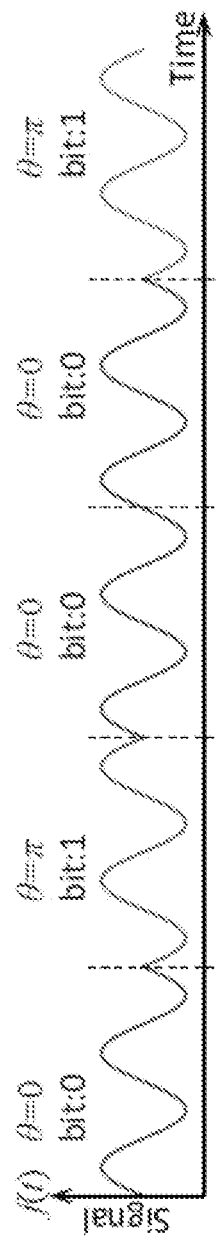
FIG. 4 is an example of an illustration of the binary phase-shift keying modulation that can be used in accordance with some embodiments.

In some embodiments, for each frequency, information can be embedded in the phase of the sinusoids. This method of embedding information is called phase-shift keying. For instance, in binary phase-shift keying, binary symbols of 0 and 1 can be embedded by using sinusoids of phase 0 and π, respectively. Bits (sinusoids with different phases) can be transmitted sequentially in time. An example for a single frequency is illustrated in FIG. 4. Since sinusoidal signals are used, for computational efficiency, computations can be performed in the Fourier domain. Equations (6) and (7) can be respectively written in the Fourier domain as:

$$I_1(\omega)=I_{tex}(\omega)*(S_1(\omega)F(\omega)) \tag{8}$$

$$I_2(\omega)=I_{tex}(\omega)*(S_2(\omega)F(\omega)) \tag{9}$$

where $\omega$ is the spatial frequency. The functions denoted by uppercase letters are the Fourier transforms of the functions denoted by the corresponding lower case letters. These two equations can be combined as:

$$I_1(\omega)*(S_2(\omega)F(\omega))-I_2(\omega)*(S_1(\omega)F(\omega))=0 \tag{10}$$

The temporal signal $f(t)$ consists of a small, discrete set of temporal frequencies $\Omega=[\omega_1, \ldots, \omega_M]$. Equation (10) needs to only be solved for the frequency set $\Omega$. Let $\vec{I}_1$ be the vector of values $[I_1(\omega_1), \ldots, I_1(\omega_M)]$. The vectors $\vec{I}_2, \vec{S}_1, \vec{S}_2,$ and $\vec{F}$ defined similarly. By observing that convolution can be expressed as multiplication by a Toeplitz matrix and element-wise multiplication as multiplication by a diagonal matrix, equation (10) can be compactly represented in matrix form as:

$$(\underline{I}_1\underline{S}_2-\underline{I}_2\underline{S}_1)\vec{F}=0 \tag{11}$$

where $\underline{I}_1$ and $\underline{I}_2$ are Toeplitz matrices defined by vectors $\vec{I}_2$ and $\vec{I}_2$, respectively, $\underline{S}_1$ and $\underline{S}_2$ are diagonal matrices defined by vectors $\vec{S}_1$ and $\vec{S}_2$, respectively. The matrices $\underline{I}_1$ and $\underline{I}_2$ are defined by captured image intensities and $\underline{S}_1$ and $\underline{S}_2$ are defined in terms of the known shutter functions. The goal is to recover the unknown vector $\vec{F}$. The above equation can be solved as a linear system of the form AX=0. In order to avoid the degenerate solution ($\vec{F}=0$) and ambiguity (if $\vec{F}$ is a solution, then $s\vec{F}$ is also a solution for any complex numbers), the constraint that $F(0)=1.0$, i.e., the DC level of the signal $f(t)$ is 1.0, can be imposed.

Because the signal $f(t)$ includes multiple bits that are transmitted sequentially, these bits can be captured at different spatial locations in the signal image. Thus, each bit can be recovered by analyzing a corresponding portion of the captured image. The size of the portion, $h_{bit}$, is the number of image rows required to encode a single bit. $h_{bit}$ can be determined by the signal frequency such that higher frequencies of g(y) (due to $f(t)$ having high temporal frequency) result in smaller portion sizes. Thus, the captured images $i_1(y)$ and $i_2(y)$ can be divided into 1-D portions, and $\vec{F}$ (the Fourier transform of $f(t)$) can be recovered by computing equation (11) on each interval individually. Since computations are done locally, $I_1(\omega)$ and $I_2(\omega)$ are the short time Fourier transforms (STFT) of $i_1(y)$ and $i_2(y)$. Once $\vec{F}$ is computed, the signal $f(t)$ and the embedded information can be recovered by applying an inverse Fourier transform. The display image $i_{tex}(x,y)$ can then be computed using equation (5): $i_{tex}(x,y)=i(x,y)/g(y)=i(x,y)/((s*f)(t_y)$. If one of the shutter functions is significantly longer than the period of the signal $f(t)$, the corresponding g(y) will be approximately constant. In that case, the corresponding captured image $i(x,y)$ is nearly flicker free, and can directly be used as the display image.

As mentioned above, in some embodiments, an exposure bracketing mode can be used to capture the two images needed to extract the information and display image in some embodiments. However, because the two images are taken sequentially, the second image samples the emitted temporal signal at a different time instant than the first image, and thus captures a different temporal signal $f'(t)$. The two images can thus be given as:

$$i_1(y)=i_{tex}(y)\times(s_1*f)(t_y) \tag{12}$$

$$i_2(y)=i_{tex}(y)\times(s_2*f')(t_y) \tag{13}$$

To solve these equations, two images and $i_{short}$ and $i_{long}$ can be captured with short and long exposures, $s_{short}$ and $s_{long}$, respectively. If $s_{long}$ chosen so that it is significantly longer than the period of the temporal signal, the signal image $g_{long}(y)=(s_{long}*f)$ is approximately constant, irrespective of the time instance when the signal is sampled. Thus:

$$(s_{long}*f)(t_y)\approx(s_{long}*f')(t_y)\approx K \tag{14}$$

where K is a constant. By using the above approximation, the two images $i_{short}$ and $i_{long}$ can be expressed as:

$$i_{short}(y)=i_{tex}(y)\times(s_{short}*f)(t_y) \tag{15}$$

$$i_{long}(y)=i_{tex}(y)\times(s_{long}*f')(t_y)\approx i_{tex}(y)\times(s_{long}*f)(t_y) \tag{16}$$

Equations (15) and (16) are the same as equations (6) and (7). Thus the signal $f(t)$ can be estimated using the same technique for solving for $f(t)$ described above.

Note that the data transmit rate is halved since only the signal transmitted during the capture of short exposure frames is decoded. Because $i_{long}(x,y)$ can be approximated as the texture image, it is also possible to estimate flicker component by calculating image ratio $i_{ratio}(x,y)=i_{short}(x,y)/i_{long}(x,y)\approx g_{short}(y)/K$.

The approach to extracting the information and the display image when using exposure bracketing described above assumes that both the scene and the camera are static while the two images are captured. If there is scene/camera motion during capture, the images need to be aligned by computing relative motion between them. Unfortunately, if the inter-frame motion is large, image alignment techniques often produce inaccurate results. This can result in erroneous signal recovery.

Any suitable exposure lengths can be used in some embodiments. For example, the two exposures can be 0.25 ms and 16 ms in some embodiments.

As described above, in order to avoid errors in the recovered signal due to motion, the two images with different exposures can be captured simultaneously in some embodiments. One way to achieve this is by using two synchronized cameras that are co-located using additional optics. In another example, two different exposures can be captured in a single image using a simultaneous dual exposure (SDE) sensor. Since little or no motion is present in these images, the signal $f(t)$ can solving for as described above.

If the sensor and the display are not temporally synchronized, the start of the transmitted signal cannot be localized in the signal image, and the signal cannot be decoded. In order to synchronize the sensor and the display, any suitable technique can be used. For example, in some embodiments a pilot symbol can be embedded in the signal to determine the beginning of the signal. The pilot symbol can be a sinusoid of a frequency (e.g., 1 kHz when only a single 2 kHz modulation frequency is used) that s not used to encode the main signal (so that it s readily detected) in some embodiments.

Additionally, in some embodiments, a guard interval based synchronization can be used to determine the start of every symbol (bit) In this scheme, the end of each symbol is copied to its beginning. Then, by self-correlating the signal $f(t)$ with itself, the beginning location of every symbol is computed.

There are various possible sources of error that can impact the technique described above for recovering $f(t)$, such as sensor saturation, low display brightness, small display area, and sensor noise. Moreover, severe occlusions where none of the pixels in a sensor row sees the display can lead to errors. Further, if the display occupies only a small area in the captured image, the signal image can have a low amplitude and the recovered signal $f(t)$ can have a low signal-to-noise ratio. In all these scenarios, the recovered signal $f(t)$ may have errors which are desirable to detect.

In order to detect errors, the left hand side of equation (11), $((\underline{I}_1\underline{S}_2 - \underline{I}_2\underline{S}_1)\vec{F})$ (where $\vec{F}$ is the recovered solution for a portion of the captured image), can be computed and if the value is greater than a prescribed threshold, the recovered signal can be determined to be erroneous. Any suitable threshold such as 0.5 can be used in some embodiments.

In some embodiments, occlusions can be addressed by creating redundancy in the transmitted signal $f(t)$. For example, the display can transmit the signal $f(t)$ repeatedly and the sensor can capture a sequence of frames (assuming small or no inter-frame motion). The signal length can be optimized so that a particular signal bit is captured in different image locations in successive captured images. Since the errors are location specific (due to occlusions or low texture brightness), if a bit is decoded incorrectly in one frame, it may be decoded correctly in a subsequent frame. The number of frames that need to be captured depends on the signal size, the extent of occlusions, the brightness of background texture, display area and sensor noise.

The above-described mechanisms can be used for any suitable application(s). For example, in some embodiments, these mechanisms can be used in a spotlight configuration in which an LED lamp illuminating a photograph on a wall is used to tag the photograph with meta-information (e.g., the time and location of the photograph) by modulating, the lamp brightness. The meta-information can then be received by capturing two rolling shutter images and extracting the meta-information and display image as described above.

As another example, in some embodiments, these mechanisms can be used for marketing and conveying meta-information (e.g., URLs, schedules of shows, item-prices and availability, etc.) via LED-based billboards installed in public places that display images and modulate the display brightness based on meta-information. Users can receive the information by simply pointing their cell phone towards the display, and the cell phone capturing images and performing the processing described above to extract the meta-information so that it can be displayed to a user.

As still another example, in some embodiments, these mechanisms can be used for pairing of cell phone screens with displays. This can allow a user to have a large display as an extension of his/her small cell phone screen, and also to share a large display with other users. Pairing of cell phones with a display can be achieved by the display broadcasting its unique pairing key as modulated display brightness. One or more users can receive the key by simply by pointing his/her/their phone(s) towards the display, the phone(s) capturing images and extracting the key information, and establishing pairing using, the key. Once pairing is established, the cell phone(s) can send data (e.g., images, videos, etc.) to be displayed on the screen using an existing communication modality, such as Wi-Fi, Bluetooth, or any other suitable communication mechanism. In some embodiments, if there are multiple displays available, the display can be selected by capturing an image of its display.

As still another example, in some embodiments, these mechanisms can be used during a presentation being given on a large screen. Using the mechanisms a member of the audience can pair their cell-phone/laptop (like described in the paragraph above) with the screen and show relevant information (e.g., additional charts, web-pages).

As still another example, in some embodiments, these mechanisms can be used to perform non-line-of-sight communication where a spotlight shining on a surface conveys meta-information about it. The information can be received by a user by simply pointing his/her cell-phone at the surface. This functionality can be used in museum settings, for example. More particularly, for example, a strategically installed spotlight can serve the dual purpose of enhancing an artifact's appearance, while simultaneously communicating information about it in an unobtrusive manner.

As still another example, in some embodiments, these mechanisms can be used for indoor navigation and location specific services. More particularly, for example, the mechanisms can utilize a single light source or an array of light sources (e.g., ceiling lights) as transmitters. The light sources, in addition to providing illumination, can also broadcast their location (or other location specific information).

In some embodiments, any suitable computer readable media can be used for storing instructions for performing the functions and/or processes described herein. For example, in some embodiments, computer readable media can be transitory or non-transitory. For example, non-transitory computer readable media can include media such t magnetic media (such as hard disks, floppy disks, etc.), optical media (such as compact discs, digital video discs, Blu-ray discs, etc., semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. Features of the disclosed embodiments can be combined and rearranged in various ways.

What is claimed is:

1. A system for extracting a message and a display image from two captured images, comprising:
 a rolling shutter sensor; and
 a hardware processor coupled to the rolling shutter sensor that is configured to:
   cause the rolling shutter sensor to capture two captured images;
   receive the two captured images; and
   extract the message and the display image from the two captured images, wherein the message is represented in the captured images as a flicker pattern based on modulated brightness of a display source that generates the display image.

2. The system of claim 1, wherein the hardware processor causes the rolling shutter sensor to capture the two captured images using an exposure bracketing mode.

3. The system of claim 2, wherein the hardware processor also performs motion compensation on at least one of the two captured images.

4. The system of claim 1, wherein the rolling shutter sensor is a simultaneous dual exposure sensor.

5. The system of claim 1, wherein the rolling shutter sensor detects phase-shift keying modulated light.

6. The system of claim 1, wherein the rolling shutter sensor detects binary phase-shift keying modulated light.

7. The system of claim 1, wherein the rolling shutter sensor detects modulated light in orthogonal frequency division multiplexing signal.

8. The system of claim 1, wherein the hardware processor detects pilot symbols in the message to synchronize detection of the message with the display source.

9. The system of claim 1, wherein the hardware processor determines a guard interval to synchronize detection of the message with the display source.

10. A method for extracting a message and a display image from two captured images, comprising:
   causing a rolling shutter sensor to capture two captured images using a hardware processor;
   receiving the two captured images using the hardware processor; and
   extracting the message and the display image from the two captured images using the hardware processor,
wherein the message is represented in the captured images as a flicker pattern based on modulated brightness of a display source that generates the display image.

11. The method of claim 10, wherein the causing the rolling shutter sensor to capture the two captured images uses an exposure bracketing mode.

12. The method of claim 11, further comprising performing motion compensation on at least one of the two captured images.

13. The method of claim 10, wherein the rolling shutter sensor is a simultaneous dual exposure sensor.

14. The method of claim 10, further comprising detecting phase-shift keying modulated light.

15. The method of claim 10, further comprising detecting binary phase-shift keying modulated light.

16. The method of claim 10, further comprising detecting modulated light in an orthogonal frequency division multiplexing signal.

17. The method of claim 10, further comprising detecting pilot symbols in the message to synchronize detection of the message with the display source.

18. The method of claim 10, further comprising determining a guard interval to synchronize detection of the message with the display source.

19. A non-transitory computer-readable medium containing computer executable instructions that, when executed by a processor, cause the processor to perform a method for extracting a message and a display image from two captured images, the method comprising:
   causing a rolling shutter sensor to capture two captured images;
   receiving the two captured images; and
   extracting the message and the display image from the two captured images, wherein the message is represented in the captured images as a flicker pattern based on modulated brightness of a display source that generates the display image.

20. The non-transitory computer-readable medium of claim 19, wherein the causing the rolling shutter sensor to capture the two captured images uses an exposure bracketing mode.

21. The non-transitory computer-readable medium of claim 20, wherein the method further comprises performing motion compensation on at least one of the two captured images.

22. The non-transitory computer-readable medium of claim 19, wherein the rolling shutter sensor is a simultaneous dual exposure sensor.

23. The non-transitory computer-readable medium of claim 19, wherein the method further comprises detecting phase-shift keying modulated light.

24. The non-transitory computer-readable medium of claim 19, wherein the method further comprises detecting binary phase-shift keying modulated light.

25. The non-transitory computer-readable medium of claim 19, wherein the method further comprises detecting modulated light in an orthogonal frequency division multiplexing signal.

26. The non-transitory computer-readable medium of claim 19, wherein the method further comprises detecting pilot symbols in the message to synchronize detection of the message with the display source.

27. The non-transitory computer-readable medium of claim 19, wherein the method further comprises determining a guard interval to synchronize detection of the message with the display source.

* * * * *